(12) United States Patent
Lefebvre et al.

(10) Patent No.: US 8,739,513 B2
(45) Date of Patent: Jun. 3, 2014

(54) GAS TURBINE ENGINE EXHAUST MIXER

(75) Inventors: Guy Lefebvre, St-Bruno de Montarville (CA); Nicolas Grivas, Dollard-des-Ormeaux (CA); Richard Bouchard, Sorel-Tracy (CA); Denis Leclair, Saint Nicephore (CA); Eric Durocher, Vercheres (CA)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 960 days.

(21) Appl. No.: 12/858,313

(22) Filed: Aug. 17, 2010

(65) Prior Publication Data
US 2011/0036068 A1    Feb. 17, 2011

Related U.S. Application Data

(60) Provisional application No. 61/234,435, filed on Aug. 17, 2009.

(51) Int. Cl.
*F02C 7/08* (2006.01)
*F02G 1/00* (2006.01)
*F02G 3/00* (2006.01)
*F02C 7/20* (2006.01)

(52) U.S. Cl.
USPC .............................. 60/39.5; 60/799

(58) Field of Classification Search
USPC ............ 60/262, 230, 39.5, 770, 226.1–226.3; 239/265.25, 265.27; 181/213, 215, 220
See application file for complete search history.

(56) References Cited

U.S. PATENT DOCUMENTS

| | | |
|---|---|---|
| 2,266,050 A | 12/1941 | Lampton |
| 2,266,858 A | 12/1941 | Gehret |
| 2,370,136 A | 2/1945 | Berliner |
| 2,394,446 A | 2/1946 | Handler |
| 2,485,534 A | 10/1949 | Mayne et al. |
| 2,511,858 A | 6/1950 | Lampton |
| 2,522,100 A | 9/1950 | Diller |
| 2,540,709 A | 2/1951 | Burton |
| 2,652,897 A | 9/1953 | Le Compte |
| 2,658,265 A | 11/1953 | Brauchler et al. |
| 2,679,682 A | 6/1954 | Gruetjen |
| 2,751,988 A | 6/1956 | Lemont, Jr. et al. |
| 2,754,916 A | 7/1956 | Woolf |
| 2,782,862 A | 2/1957 | Wright |
| 2,807,870 A | 10/1957 | Harness |
| 2,882,974 A | 4/1959 | Boegehold |
| 2,981,337 A | 4/1961 | Stuart, III |
| 3,092,205 A | 6/1963 | Brown et al. |

(Continued)

*Primary Examiner* — Phutthiwat Wongwian
*Assistant Examiner* — William Breazeal
(74) *Attorney, Agent, or Firm* — Norton Rose Fulbright Canada LLP

(57) ABSTRACT

An exhaust mixer for a gas turbine engine includes an annular wall having upstream end adapted to be fastened to an engine case and a downstream end forming a plurality of inner and outer mixer lobes. A support member interconnects at least a number of the inner lobes, and includes a circumferentially extending stiffener ring located radially inwardly from the inner lobes and a series of circumferentially spaced apart mixer struts radially extending from the inner lobes to the stiffener ring. The mixer struts have a radial length at least equal to a width of a main gas path defined between the inner lobes and the exhaust cone such that the mixer struts extend entirely through the main gas path. The stiffener ring being fixed solely to the mixer struts such as to float with respect to the exhaust cone and permit relative movement therebetween.

20 Claims, 8 Drawing Sheets

(56) References Cited

U.S. PATENT DOCUMENTS

| | | | |
|---|---|---|---|
| 3,393,436 A | 7/1968 | Blackhurst et al. | |
| 3,527,546 A | 9/1970 | Zeman | |
| 3,647,021 A * | 3/1972 | Millman et al. | 181/220 |
| 4,117,671 A | 10/1978 | Neal et al. | |
| 4,147,029 A * | 4/1979 | Sargisson | 60/262 |
| 4,191,508 A | 3/1980 | Kuroda et al. | |
| 4,235,568 A | 11/1980 | Zenkner | |
| 4,335,801 A * | 6/1982 | Stachowiak et al. | 181/213 |
| 4,813,230 A | 3/1989 | Braithwaite | |
| 5,265,807 A | 11/1993 | Steckbeck et al. | |
| 5,440,875 A | 8/1995 | Torkelson et al. | |
| 5,984,638 A | 11/1999 | Gresh et al. | |
| 6,854,260 B2 | 2/2005 | Anderson | |
| 7,017,331 B2 | 3/2006 | Anderson | |
| 7,043,898 B2 | 5/2006 | Rago | |
| 7,251,927 B2 | 8/2007 | Anderson | |
| 2008/0115484 A1 | 5/2008 | Conete et al. | |
| 2009/0000304 A1 | 1/2009 | Anderson et al. | |
| 2010/0043386 A1 * | 2/2010 | Perveiler et al. | 60/39.5 |

\* cited by examiner

GAS TURBINE ENGINE EXHAUST MIXER

CROSS-REFERENCE TO RELATED APPLICATION

This application claims priority on U.S. provisional patent application Ser. No. 61/234,435, filed Aug. 17, 2009, which is incorporated herein by reference.

TECHNICAL FIELD

The application relates generally to aircraft gas turbine engines and, more particularly, to exhaust mixers thereof.

BACKGROUND OF THE ART

In turbofan gas turbine engines, high velocity air from the turbofan core is mixed with low velocity air from the bypass duct, and this mixed air is then exhausted from the engine. Such turbofan engines generally use exhaust mixers in order to increase the mixing of the high and low velocity exhaust gas flows. Exhaust mixers may experience thermal variation and/or radial deflection due to exposure to the high and low velocity flows. In addition, exhaust mixers may be prone to vibrations, which has negative consequences for the surrounding hardware. As such, it is generally desirable to increase the stiffness or rigidity of the exhaust mixer. Various configurations of exhaust mixers have been used to date in order to try to increase the stiffness or reduce deflection thereof. However, most of the prior art methods or configurations involve significant drawbacks.

Therefore, there remains a need for an improved exhaust mixer for a gas turbine engine.

SUMMARY

In one aspect, there is provided an a gas turbine engine having an engine casing enclosing a compressor section, a combustor and a turbine section defining a main gas path serially extending therethrough, and comprising: an exhaust cone disposed downstream of the turbine section; an exhaust mixer connected solely to an aft end of the engine casing such as to be cantilevered therefrom, the exhaust mixer at least partially surrounding the exhaust cone such as to define a portion of the main gas path between an outer surface of the exhaust cone and an annular wall defining a plurality of circumferentially distributed alternating inner and outer lobes of the exhaust mixer, the exhaust mixer including a support member connected to at least a number of the lobes, the support member including a circumferentially extending stiffener ring located radially inward from the lobes and a series of circumferentially spaced apart mixer struts which radially extend through the main gas path between the lobes and the stiffener ring, the mixer struts extending though at least one opening formed in the outer surface of the exhaust cone such that the stiffener ring is located radially inward of the outer surface of the exhaust cone, the stiffener ring being connected only to the support struts such as to be free to move relative to the exhaust cone.

In another aspect, there is provided an exhaust mixer of a gas turbine engine mounted at an exhaust of the gas turbine engine such as to at least partially surround an exhaust cone, the exhaust mixer comprising: an annular wall having upstream end adapted to be fastened to an engine case and a downstream end forming a plurality of circumferentially distributed alternating inner and outer mixer lobes; and a support member disposed proximate the downstream end of the annular wall and interconnecting at least a number of the inner lobes, the support member including a circumferentially extending stiffener ring located radially inwardly from the inner lobes, and a series of circumferentially spaced apart mixer struts radially extending from the inner lobes to the stiffener ring, the mixer struts having a radial length at least equal to a width of a main gas path defined between the inner lobes and the exhaust cone such that the mixer struts extend entirely through the main gas path, the stiffener ring being fixed solely to the mixer struts such as to float with respect to the exhaust cone and permit relative movement therebetween.

BRIEF DESCRIPTION OF THE DRAWINGS

Reference is now made to the accompanying figures in which.

DETAILED DESCRIPTION

Figure 1:
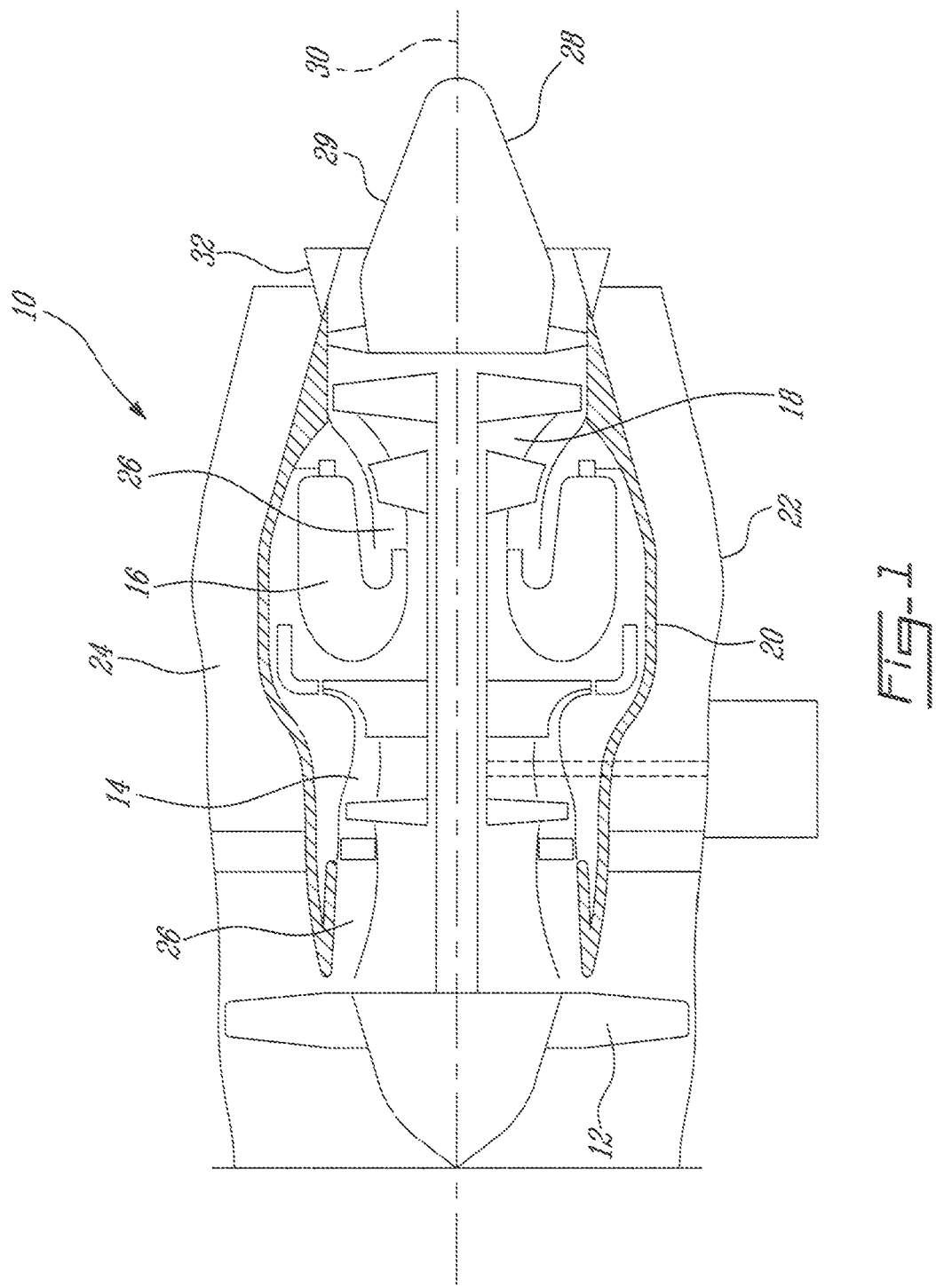
FIG. 1 is a schematic cross-sectional view of a turbofan gas turbine engine.

FIG. 1 illustrates a turbofan gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases.

The gas turbine engine 10 includes a core engine casing 20 which encloses the turbo machinery of the engine, and an outer casing 22 disposed radially outwardly of the core engine casing 20 such as to define an annular bypass passage 24 therebetween. The air propelled by the fan 12 is split into a first portion which flows around the core engine casing 20 within the bypass passage 24, and a second portion which flows through the core of the engine via a main gas path 26, which is circumscribed by the core engine casing 20 and allows the flow to circulate through the multistage compressor 14, combustor 16 and turbine section 18 as described above.

At the aft end of the engine 10, an exhaust cone 28 is centered about a longitudinal axis 30 of the engine 10, the exhaust cone being connected to an aft end of the turbine section 18. The exhaust cone 28 has an outer surface 29 which defines an inner wall of the main gas path 26 so that the combustion gases flow therearound.

Figure 2:
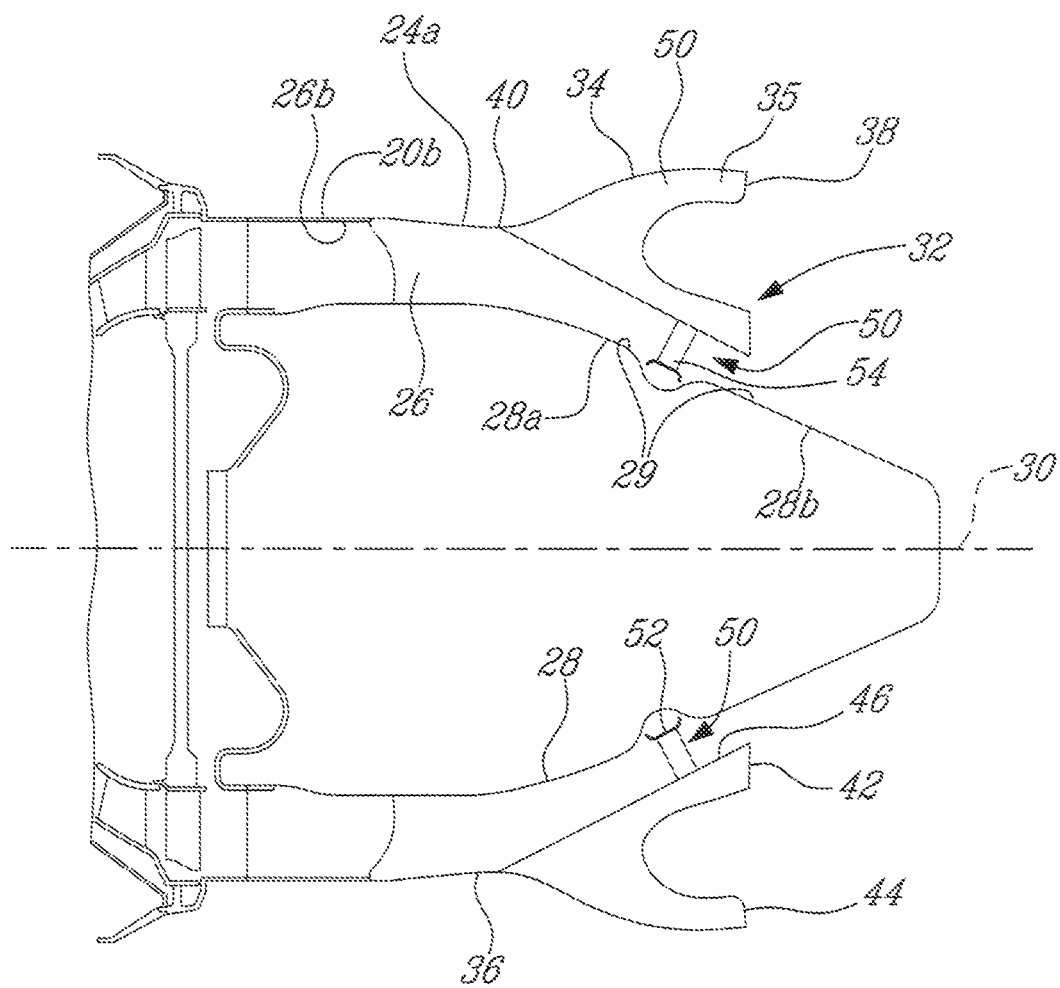
FIG. 2 is a schematic cross-sectional view of an exhaust mixer, having a support member connected to mixer lobes thereof, in accordance with one embodiment of the present disclosure.

As best seen in FIG. 2, the exhaust cone 28 includes a front portion 28a and a rear portion 28b, the front and rear portions 28a, 28b being either integrally formed as shown or being separate parts connected together by suitable means, such as a series of fasteners, welding, etc. An annular exhaust mixer 32 surrounds at least a portion of the exhaust cone 28, the mixer 32 being connected to an aft portion 20b of the core engine casing 20. The annular exhaust mixer 32 at least partially acts as an extension of a rearmost portion of the outer wall 26b of the main gas path 26 and a rearmost portion of the inner wall 24a of the bypass passage 24. The hot combustion gases from the main gas path 26 and the cooler air from the bypass passage 24 are thus mixed together by the mixer 32 such as to produce an engine exhaust yielding a greater thrust.

Figure 3:
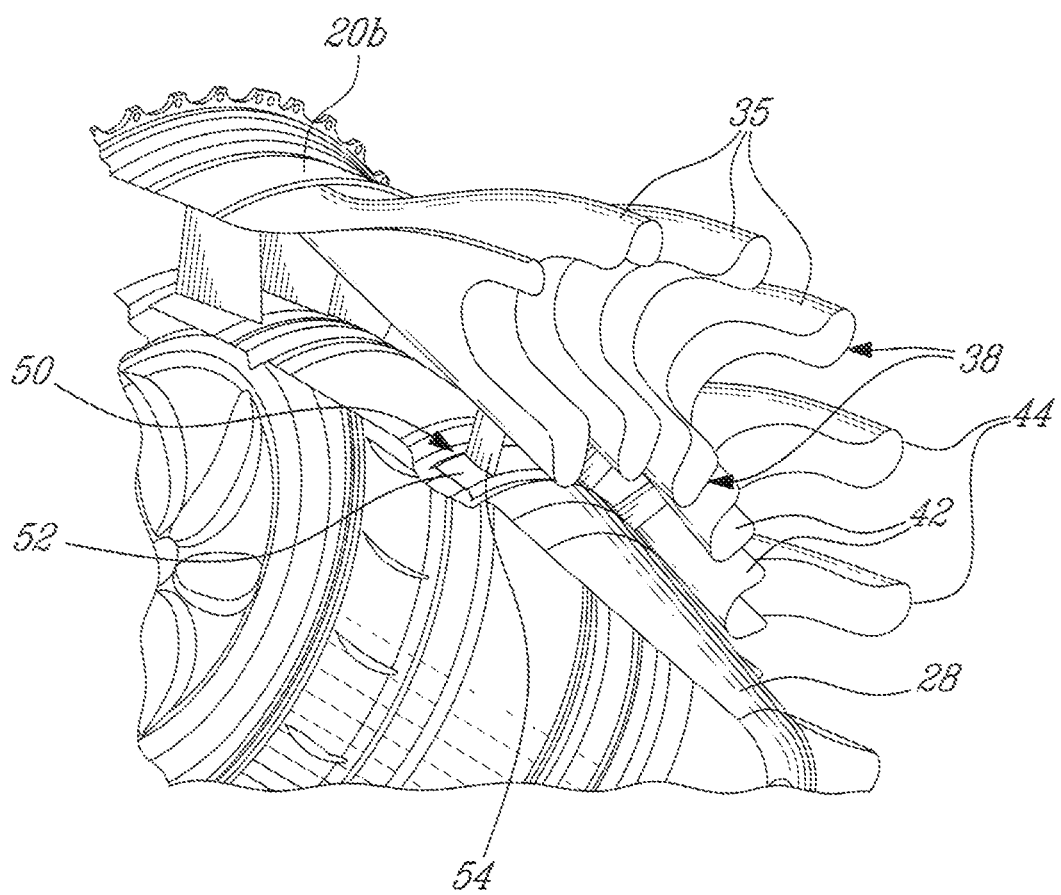
FIG. 3 is a rear perspective view, partially sectioned, of the exhaust mixer as shown in FIG. 2.

Referring to FIGS. 2-3 in further detail, the mixer 32 includes an annular wall 34 defining a plurality of circumferentially distributed lobes 35 extending rearwardly from a front frustoconical portion 40 of the mixer 32 to a downstream end 38, i.e. a trailing edge thereof. The mixer lobes 35 include alternating inner radial lobes 42 and outer radial lobes 44, with the outer lobes 44 extending into the bypass passage 24 and the inner lobes 42 extending into the main engine core gas path 26. In the embodiment shown, each lobe 42, 44 extends longitudinally from the frustoconical portion 40 to the downstream end 38 of the mixer 32.

Figure 4:
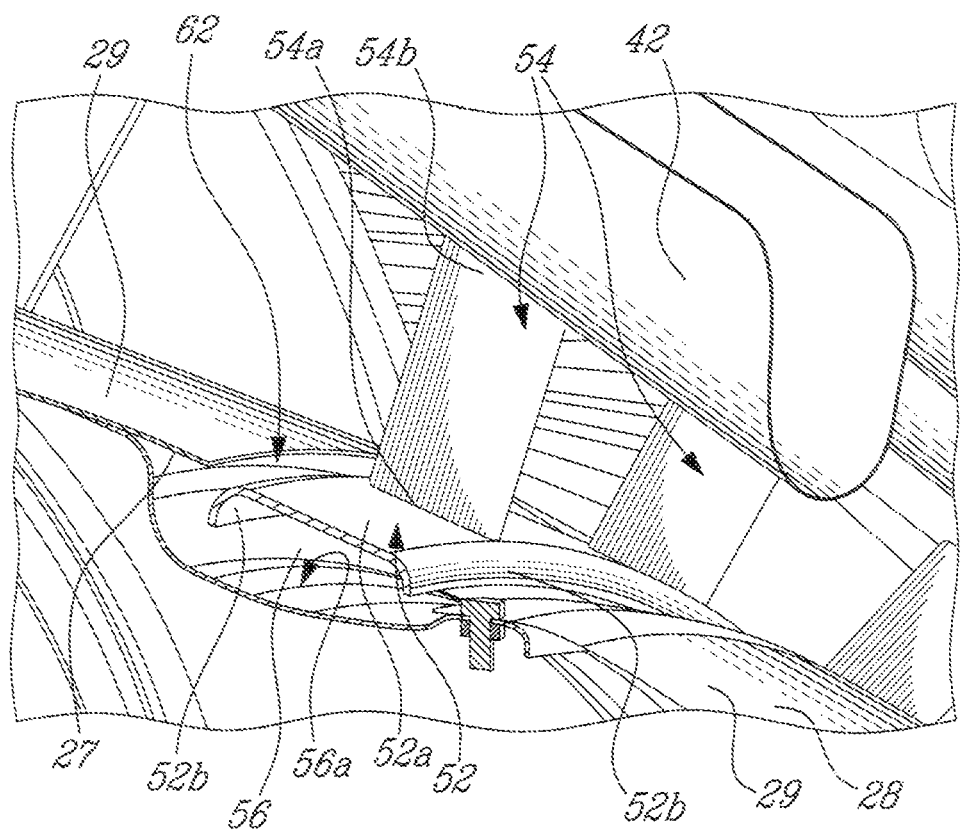
FIG. 4 is an enlarged rear perspective view of the support member of the exhaust mixer of FIG. 3.
Figure 5:
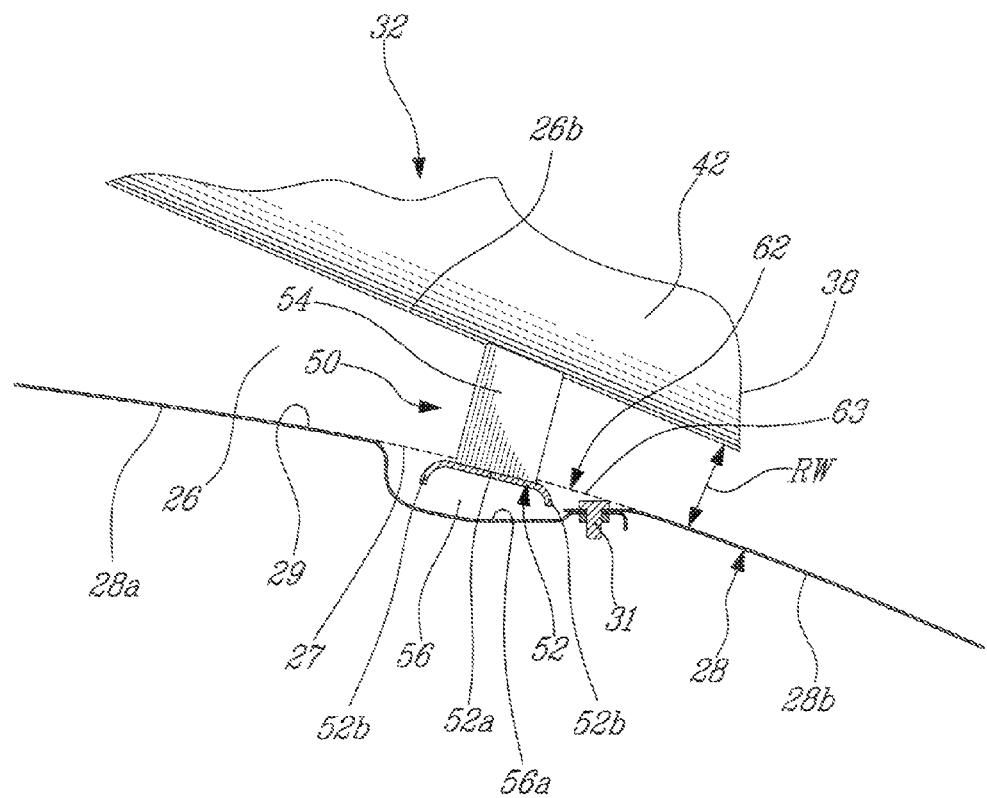
FIG. 5 is a schematic cross-sectional side view of the support member of the exhaust mixer of FIG. 3.

As best seen in FIG. 2, the exhaust mixer 32 is solely connected to and supported by the aft end 20b of the core engine casing 20. In order to provide additional support to the exhaust mixer 32, the exhaust mixer includes a support member 50 connected to the inner lobes 42 thereof, as best seen in FIGS. 3-5. The support member 50 comprises an annular stiffener ring 52, which is radially spaced apart (inwardly) from the inner lobes 42. and a series of circumferentially spaced apart and radially extending mixer struts 54 which interconnect the stiffener ring 52 and the inner lobes 42. As seen in FIGS. 3-5, the stiffener ring 52 is positioned radially inward with respect to the inner lobes 42. and is suspended therefrom by the mixer struts 54. As will be described in further detail below, the stiffener ring 52 is free floating such that the aft end of the exhaust mixer, and thus the support member 50 thereon, is cantilevered from the aft end 20b of the core engine casing 20. In one embodiment, the support member 50 may be connected to each of the inner lobes 42, but in an alternate embodiment, the support member 50 may include fewer support struts 54 than there are inner lobes 42 of the mixer 32, and thus only some of the inner lobes 42 have support struts 54 extending from the radially inner end thereof such as to directly connect these lobes 42 to the stiffener ring 52.

Referring to FIGS. 4-5, the mixer struts 54 extend radially through the main gas path 26 from the inner lobes 42 to the stiffener ring 52. Each mixer strut 54 includes an outer radial end 54b which is connected to the inner lobes 42 and an inner radial end 54a which is connected to the stiffener ring 52, and which is opposite the outer radial end 54b. The mixer struts 54 extend a radial distance which is at least substantially equal to a radial width RW (see FIG. 5) of the main gas path 26 from the exhaust mixer 32 to the exhaust cone 28, i.e. from the main gas path outer wall 26b to the outer surface 29 of the exhaust cone 28, such that the stiffener ring 52 lies outside the main gas path 26. Accordingly, the stiffener ring 52 is located slightly radially inward of the predicted gas path profile along the outer surface 29, as depicted by the dotted line 63 in FIG. 5.

In the embodiment shown, the mixer struts 54 are connected to the inner lobes 42 at the innermost radial portion thereof, and one mixer strut 54 extends between each of the inner lobes 42 and the stiffener ring 52. The struts 54 may be welded to the inner lobes 42, or alternatively may be fastened thereto using bolts, rivets or other suitable fasteners, for example. In the embodiment shown, the mixer struts 54 are located in proximity of the downstream end 38 of the exhaust mixer 32. In an alternate embodiment, however, the mixer struts 54, and thus the support member 50, may be connected to the outer lobes 44 instead of the inner lobes 42.

Figure 7:
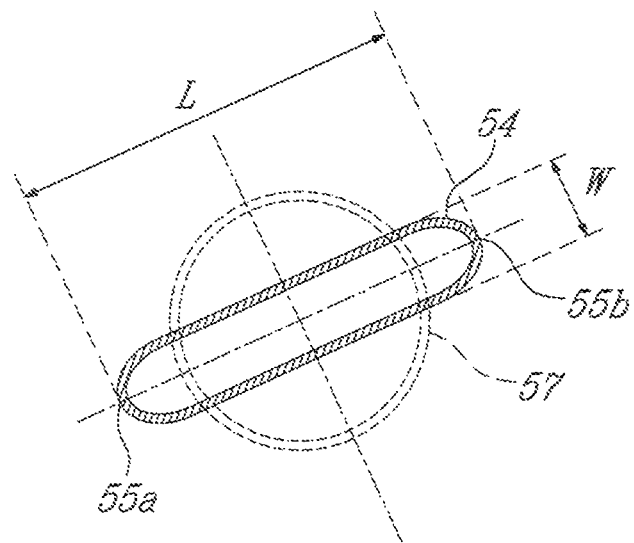
FIG. 7 is a transverse cross-sectional view of a mixer strut of the support member of FIG. 3, shown both prior to being formed, as illustrated with dotted lines, and after being formed, as illustrated with solid lines.

Because the support struts 54 of the support member 50 extend through main gas path 26, the struts 54 have a generally aerodynamic profile for limiting any obstruction of the high velocity flows passing through the main gas path 26. In one particular embodiment, the strut 54 may have an aerodynamic profile is illustrated in FIG. 7. As seen in FIG. 7, the finished shape of the strut 54, shown in solid lines, is generally elongated such that it extends a longitudinal length L in the direction of flow through the main gas path 26 that is greater than the narrower transversal width W in a direction perpendicular to the direction of the flow through the main gas path 26. The longitudinal length L of the struts 54 is thus greater than the transversal width W, such that the transversal width W is minimized in order to reduce any turbulence caused in the flow through the main gas path 26 and to reduce back pressure. In addition, the strut 54 has an upstream end 55a which faces the incoming flow through the main gas path 26 and a downstream end 55b, opposite the end 55a. The upstream and downstream ends 55a, 55b are rounded in order to reduce any obstruction caused by the struts 54 to the flow passing through the main gas path 26. The specific mixer strut aerodynamic profile shown in FIG. 7 is exemplary only, and in other embodiments, various struts 54 having an aerodynamic profile may alternatively be used. For example, the ends 55a, 55b may be different and need not be identical. As such, the scope of the present disclosure should not be limited to the specific aerodynamic shape of the strut 54 shown in FIG. 7.

Referring back to FIGS. 3-6, the stiffener ring 52 extends circumferentially about the longitudinal axis 30 of the engine 10. In the embodiment shown, the stiffener ring 52 comprises an annular longitudinal portion 52a and annular inwardly radially curved ends 52b on either axial side of the longitudinal portion 52a, such that the stiffener ring 52 forms a substantially U-shaped cross-sectional profile. This U-shape (or C-shape) of the stiffener ring 52 helps to increase the rigidity thereof. In other embodiments, the stiffener ring 52 may have various annular shapes.

The stiffener ring 52 is spaced apart from the exhaust cone 28 and floats with respect thereto, i.e. the stiffener ring 52 at least does not directly contact the exhaust cone 28 when disposed in its resting and normal operating position (as shown in FIG. 5, for example). As such, the stiffener ring 52 is not fastened to the exhaust cone 28 and thus is free to move, for example in a radial direction, with respect thereto. Therefore, in the present embodiment, the stiffener ring 52 is solely connected to the mixer struts 54. As seen in FIGS. 3-6, the mixer struts 54 extend through at least one opening 62 in the outer surface 29 of the exhaust cone 28, such that the stiffener ring 52 is located at least slightly radially inward of the outer surface 29 of the exhaust cone 28 and thus radially inward of the main gas path 26.

In the embodiment shown in FIGS. 4-5, the opening 62 in the outer surface of the exhaust cone 28 forms a circumferentially extending channel or cavity 56 in the outer surface 29 thereof. The stiffener ring 52 is located inside this circumferential channel 56 and is spaced apart from an inner surface 56a of the channel 56, such that it remains free to move relative thereto without coming into contact with the inner surface 56a. The radially outer surface of the longitudinal portion 52a of the stiffener ring 52 is, when disposed in a normal operating position, disposed substantially parallel to the outer surface 29 of the exhaust cone 28 in a fore-aft direction thereof.

Further, as best seen in FIG. 5, the stiffener ring 52 is located slightly radially inward of the predicted gas path profile along the outer surface 29, as depicted by the dotted line 63. As such, the stiffener ring 52 is at least substantially flush with the predicted gas path profile 63, such that the stiffener ring 52 provides an inner boundary wall surface for the main gas path 26 and thus acts as the outer surface 29 of the exhaust cone 28, at least within the channel 56. Therefore, any aerodynamic loss in the fluid flow of the main gas path 26 in the vicinity of the channel 56 is minimized due to the stiffener ring 52 which acts as an inner surface of the main gas path 26 along at least a portion of the longitudinal length of the channel 56 and so along a portion of the longitudinal length of the main gas path. The stiffener ring 52 therefore helps prevent much of the gas flow from entering the channel 56 and causing undue turbulence therein. In addition, the stiffener ring 52 is of sufficient length to "hide" (i.e. direct the gas flow overtop of) the fasteners 31, if present to connect the two portions 28a, 28b of the exhaust cone 28, such that the fluid flow in the main gas path 26 is not negatively affected by the presence of the fasteners 31. In an alternate embodiment, the stiffener ring 52 may be located inside the channel 56, but may be located substantially radially inward of the predicted gas path profile 63 while remaining sufficiently spaced apart from the inner surface 56a of the cavity 56 to permit relative movement therebetween without contacting each other.

In another embodiment, however, the struts 54 need not extend through the openings 62 and may include inner radial ends 54a which are located at the openings 62 or slightly outward thereof, such that the stiffener ring 52 is located at the opening 62 or slightly inward thereof. In such an embodiment, the stiffener ring 52 is located inside the opening 62 in the exhaust cone 28 formed by the open-topped annular channel 56, yet is free to move with respect thereto.

As mentioned, the exhaust mixer 32 is solely connected to the engine 10 at the aft end 20b of the core engine casing 20, and so, the exhaust mixer is effectively cantilevered from the core engine casing 20. This cantilevered configuration allows the lobes 42, 44 of the exhaust mixer 32 to vibrate at one or more modes in the engine operating frequency range, while remaining relative stiff and without the stiffening ring or the support struts contacting the exhaust cone 28. In addition, the thermal variations in the exhaust mixer 32 due to the high and low velocity flows through the main gas path 26 and the bypass passage 24 may cause axial and radial displacements in the mixer 32, which can accordingly be absorbed by the exhaust mixer 32. Moreover, the downstream end 38 of the mixer 32, which would otherwise be prone to deflection, is reinforced by the stiffener ring 52 which serves to increase the rigidity of the exhaust mixer 32 and thus inhibit movement at the downstream end 38 thereof. By joining all the inner lobes 32 together with a stiffener ring 32, any movement of the exhaust mixer 32 is reduced, as are the vibrations thereof. In addition, by providing a stiffener ring 52 which is independent of the exhaust cone 28, i.e. it is free to move relative thereto such as to absorb any vibrations or thermal growth mismatches therebetween, the stiffener ring 52 is able to accommodate any axial or radial displacements due to such thermal variations. As such, the exhaust mixer 32 provides enhanced rigidity and may accommodate thermal variations, vibrations and other displacements, as required.

In all cases, the stiffener ring 52 is located outside of the main gas path 26 and as such, does not obstruct the fluid flow passing therethrough. Moreover. as mentioned, the struts 54 are aerodynamically-shaped so as to reduces any disturbances caused thereby to the fluid flow in the main gas path 26. As such, the exhaust mixer 32 includes a support member 50 which minimizes any disturbances caused thereby to the fluid flow passing through the main gas path 26.

Furthermore, a circumferential ledge 27 connected to the outer surface 29 of the forward portion 28a of the exhaust cone 28, immediately at the axial front edge of the channel 56, may be provided. This circumferential ledge 27 overhangs at least a portion of the cavity 56, such as to thereby form an extension or continuation of the outer surface 29 of the exhaust cone 28. The circumferential ledge 27 directs the main gas path flow axially over the channel and towards the annular stiffener ring 52, to thereby reduce the amount of gas flow which is introduced into the channel 56. The ledge 27, in combination with the stiffener ring 52 with is substantially aligned therewith, thereby form a discontinuous gas path surface to at least partially enclose at the channel 56. Although in the embodiment shown the stiffener ring 52 and the ledge 27 do not extend a whole longitudinal length of the cavity 56, the ledge 27 helps to reduce any possible disturbances in the fluid flow through the main gas path 26 which might otherwise be caused by the presence of the cavity 56 in the outer surface of the exhaust cone 28.

Figure 6:
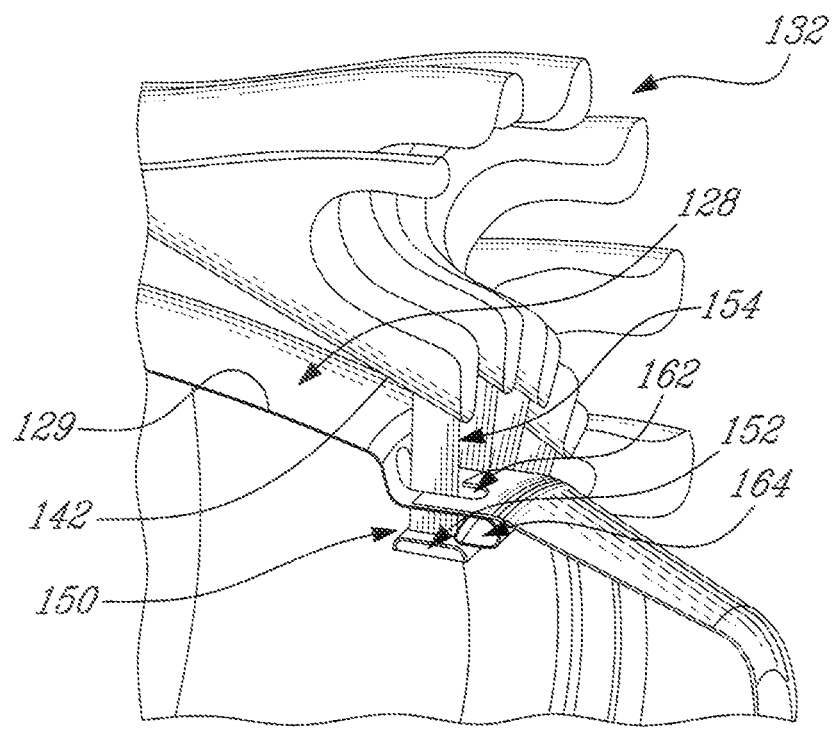
FIG. 6 is a partially sectioned perspective view of an exhaust mixer in accordance with an alternate embodiment of the present disclosure, having an alternate support member connected to mixer lobes thereof.

Referring now to FIG. 6, the alternate support member 150 of the exhaust mixer 132 is similar to the support member 50 described above, however in this embodiment the exhaust cone 128 includes a plurality of individual openings 162 formed in the outer surface 129 of the exhaust cone 128 and which are circumferentially spaced apart therein. In this embodiment, the support member 150 includes longer support struts 154 which extend from the inner lobes 142 of the mixer 132, through the openings 162 and are fastened to a stiffener ring 152 located radially inside the exhaust cone 128, i.e. radially inward of the outer wall surface 129 of the exhaust cone 128. As such, the stiffener ring 152 is located inside the exhaust cone 128 and so does not obstruct the fluid flow through the main gas path 26. Further, the openings 162 formed in the outer wall surface 129 of the exhaust cone 129 are smaller in size than the larger continuous channel 56 described in the embodiment of FIGS. 3-5. These individual, closed perimeter openings 162 need only be sufficiently large to receive the support struts 154 therethrough, thereby further minimizing the gas flow losses. In addition, a circumferential dampening cord 164 which is located inside the exhaust cone 128 and which is connected to the support member 150 may be provided. The dampening cord 164 extends circumferentially about the longitudinal axis 30 from an inner radial surface of the exhaust cone 128 to the stiffener ring 152. The dampening cord 164 forms a compliant connection between the exhaust cone 28 and the stiffener ring 152 and may be used to dampen any excessive movement of the stiffener ring 152. In addition, the dampening cord 164 reduces any fretting of the ring 152 and may improve the repairability thereof. In one embodiment, the openings 162 may also act as ventilation holes in the exhaust cone 128 for venting air from within the exhaust cone 128 into the main gas path flow.

The mixer struts 54, 154 may be produced from extruded standard seamless tubing using any of a number of forming techniques known in the art, such as hydroforming for example. As seen in FIG. 7, an extruded standard seamless tube prior to being formed into an exhaust mixer strut 54, 154 is represented by the dotted line 57, the tube having an initially circular cross-sectional shape and having a relatively thin wall thickness. The extruded standard seamless tube is subsequently formed into a strut 54 having an aerodynamic profile, as shown in solid lines in FIG. 7. Moreover, the strut 54 may thus be formed from extruded standard seamless tubing without requiring any weld joints at the leading and trailing edges thereof. Therefore, by producing the struts 54 from standard seamless tubing, the strut 54 may have a thin wall thickness, which lowers the weight of the strut, and may be made without requiring any welding. As such, the tooling required in making the struts 54,154, the number of manufacturing steps required during the production thereof, as well as the overall cost of the mixer struts 54,154, may be reduced by producing the mixer struts using extruded standard seamless tubing which is then formed into the required aerodynamic shape. In another embodiment, the mixer struts may be produced using various alternate methods, such as by casting, machining, etc.

Figure 8:
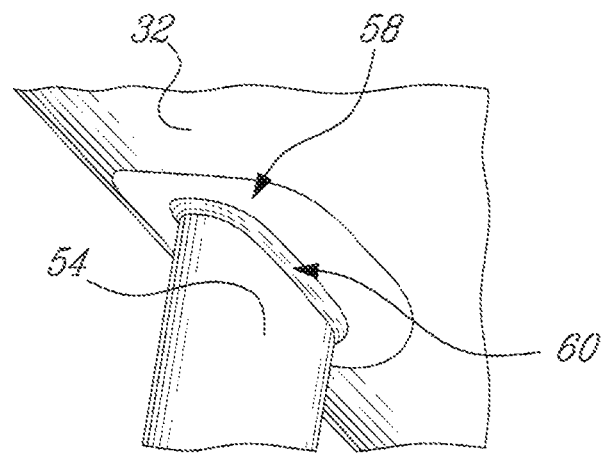
FIG. 8 is a perspective view of a reinforced sole of the support member of FIG. 3.

In one particular embodiment, as seen in FIG. 8, the mixer struts 54 may be connected to the inner radial lobes 42 of the exhaust mixer 32 using a reinforced sole 58, which extends about the full periphery of the strut 54 and provides greater structural integrity at the junction between the mixer lobes 42 and the struts 54. The reinforced sole 58 has a generally similar shape as that of the inner lobe 42 and may be connected to the mixer 32 using various means, such as welding, etc. For example, a portion of the inner lobe 42 substantially equivalent in shape to that of the reinforced sole 58 may be cut out from the lobe 42, and the reinforced sole 58 may be welded in its place at the cut out line. In another embodiment, the reinforced sole 58 may be butt welded at the cut out line. The strut 54 is welded to the reinforced sole 58, and in one embodiment, a fillet weld 60 is formed therebetween.

When thin sheet metal components are welded together, the weld joint therebetween may decrease the thickness of the components, which may increase the stresses therein due to weld penetration variation and/or may lead to an increase in dynamic/thermal stress concentrations. Due to these factors, the weld joint could generate crack initiation/propagation in the thin sheet metal components. The reinforced sole 58 therefore has a thickness which is greater than that of the thin sheet metal used to form the exhaust mixer 32 and the struts 54. Therefore, the reinforced sole 58 allows a larger fillet weld 60 to be formed between the inner lobes 42 of the mixer 32 and the mixer struts 54, which helps to reduce stresses therein and minimizes crack initiation/propagation. As such, it is possible to have an exhaust mixer 32 and a mixer strut 54 with a thin sheet metal thickness such as to save weight, while not contributing to larger stresses therebetween due to the locally thicker reinforced sole 58. As such, the weight of the mixer 32 may be reduced by providing a mixer 32 with an overall reduced wall thickness.

Figure 9:
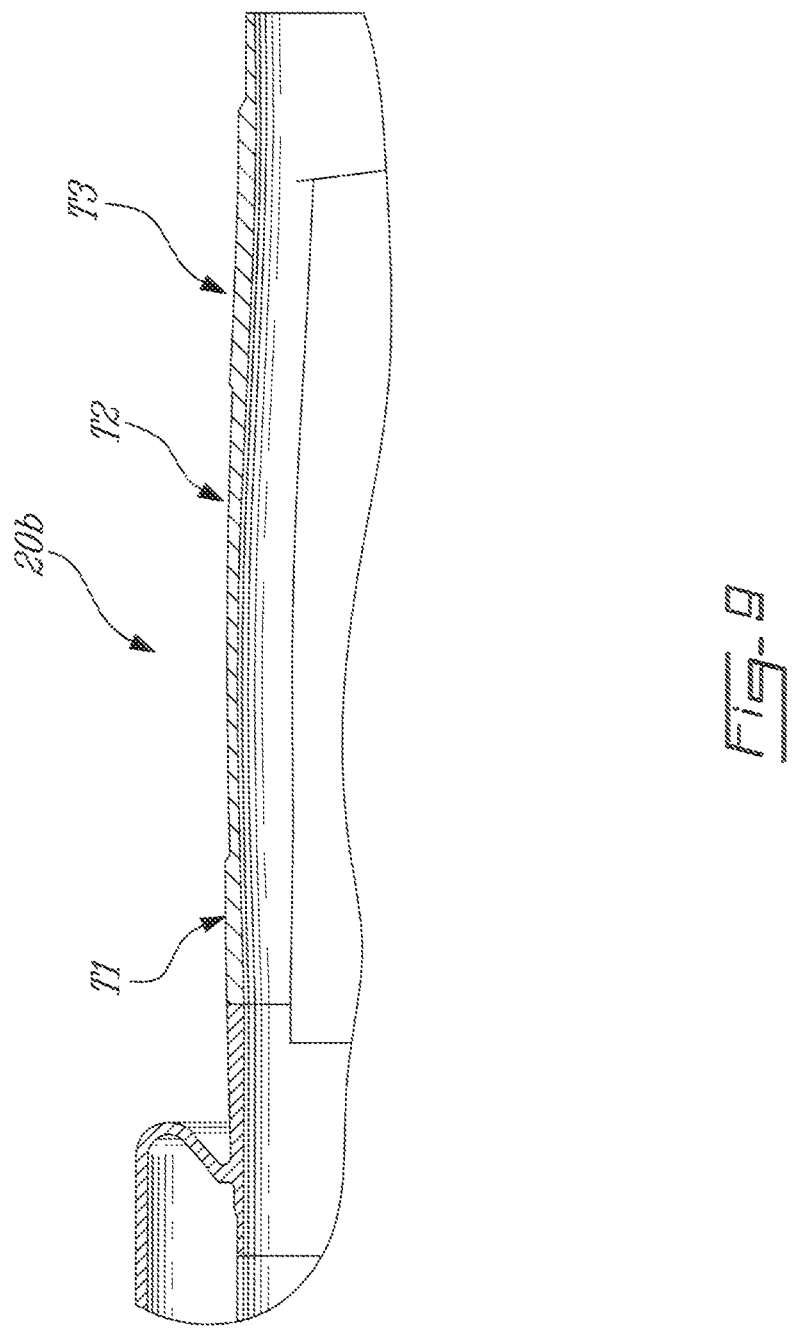
FIG. 9 is a cross-sectional view of an aft portion of a core engine casing of the engine of FIG. 1.

As mentioned, the exhaust mixer 32 is connected to the aft portion 20b of the core engine casing 20, shown in FIGS. 3 and 9. which encloses the turbo machinery of the engine 10. As seen in FIG. 9, the aft portion 20b of the core engine casing 20 may have different wall thicknesses, T1, T2, T3, at specific locations thereof in order to contain differing stresses therein. In one embodiment, the aft portion 20b of the core engine casing 20 may be made using a single sheet metal piece, which is rolled and the two opposed ends welded so as to form a cylindrical tube or ring. A constraint fixture may then be inserted into the cylindrical ring so as to hold the ring from the inside using radial locators at several circumferential locations thereof. Each radial locator of the constraint fixture may then be expanded against the inner wall of the cylindrical ring in order to obtain a cylindrical ring having a cross-sectional profile which is adequately rounded in a constrained state thereof. The cylindrical ring, in a constrained state, may then be machined using a lathe, in order to obtain a desired thickness of the cylindrical ring at different axial locations thereof. The cylindrical ring may then be removed from the constraint fixture and may be plastically deformed outward using one of various forming processes known in the art, in order to obtain a gas path duct having a desired shape. By so producing the engine casing using sheet metal, cost and weight savings are obtained. In addition, a smooth gas path surface is provided due to the casing being made from only one piece of sheet metal, as opposed to prior art casings which are constructed using multiple parts welded together. The method of making a casing described herein may be used not only to fabricate the core engine casing 20, but may also be used to form other casings or ducts which include wall portions having different thicknesses. For example, the method may be used not only for the aft portion 20b of the core engine casing 20, but additionally for other portions thereof, or alternatively for the inner wall 26a of the main gas path 26 or for the outer casing 22.

The above description is meant to be exemplary only, and one skilled in the art will recognize that changes may be made to the embodiments described without departing from the scope of the invention disclosed. For example, the invention may be used with various types of bypass gas turbine engines where two flow streams are mixed. Still other modifications which fall within the scope of the present invention will be apparent to those skilled in the art. in light of a review of this disclosure, and such modifications are intended to fall within the appended claims.

The invention claimed is:

1. A gas turbine engine having an engine casing enclosing a compressor section, a combustor and a turbine section defining a main gas path serially extending therethrough, and comprising:
   an exhaust cone disposed downstream of the turbine section; and
   an exhaust mixer connected solely to an aft end of the engine casing such as to be cantilevered therefrom, the exhaust mixer at least partially surrounding the exhaust cone such as to define a portion of the main gas path between an outer surface of the exhaust cone and an annular wall defining a plurality of circumferentially distributed alternating inner and outer lobes of the exhaust mixer, the exhaust mixer including a support member connected to at least a number of the lobes, the support member including a circumferentially extending stiffener ring located radially inward from the lobes and a series of circumferentially spaced apart mixer struts which radially extend through the main gas path between the lobes and the stiffener ring, the mixer struts extending though at least one opening formed in the outer surface of the exhaust cone such that the stiffener ring is located radially inward of the outer surface of the exhaust cone, the stiffener ring being connected only to the support struts such as to be free to move relative to the exhaust cone.

2. The gas turbine engine according to claim 1, wherein the mixer struts extend a radial distance which is at least substantially equal to a width of said portion of the main gas path, such that the stiffener ring is located radially inward of the main gas path.

3. The gas turbine engine according to claim 1, wherein the at least one opening forms a circumferentially continuous open-toped channel in the outer surface of the exhaust cone, the stiffener ring being located within said channel without contacting the exhaust cone during normal operation, the stiffener ring being radially inward of a predicted gas path profile flowing along the outer surface of the exhaust cone.

4. The gas turbine engine according to claim 3, wherein the stiffener ring is substantially flush with the predicted gas path profile.

5. The gas turbine engine according to claim 4, wherein a circumferential ledge is disposed on the outer surface of the exhaust cone at an edge of the channel formed therein, the circumferential ledge overhanging a portion of the channel to direct gas flow over said channel.

6. The gas turbine engine according to claim 5, wherein the ledge and the stiffener ring are substantially aligned such as to form a discontinuous gas path surface over at least a portion of the channel.

7. The gas turbine engine according to claim 1, wherein the at least one opening formed in the outer surface of the exhaust cone comprises a plurality of individual closed-perimeter openings which are circumferentially distributed thereabout, each said mixer strut extending through one of the openings, and the stiffener ring being located inside the exhaust cone.

8. The gas turbine engine according to claim 7, wherein a circumferential dampening cord extends from an inner radial surface of the exhaust cone to the stiffener ring, the dampening cord being operably connected to the stiffener ring.

9. The gas turbine engine according to claim 1, wherein the mixer struts include hollow tubes which are substantially seamless along their length.

10. The gas turbine engine according to claim 1, wherein the mixer struts are formed of extruded standard seamless tube and have an aerodynamic profile.

11. The gas turbine engine according to claim 1, wherein the stiffener ring has a substantially U-shaped cross-sectional profile, including an annular longitudinal portion and radially inwardly curved circumferential edges on either side of the longitudinal portion.

12. The gas turbine engine according to claim 1, wherein the mixer struts are connected to the lobes by a reinforced sole, the reinforced sole having a thickness greater than that of a wall thickness of the lobes.

13. The gas turbine engine according to claim 1, wherein each of inner lobes has a mixer strut fixed thereto.

14. An exhaust mixer of a gas turbine engine mounted at an exhaust of the gas turbine engine such as to at least partially surround an exhaust cone, the exhaust mixer comprising:
an annular wall having upstream end adapted to be fastened to an engine case and a downstream end forming a plurality of circumferentially distributed alternating inner and outer mixer lobes; and
a support member disposed proximate the downstream end of the annular wall and interconnecting at least a number of the inner lobes, the support member including a circumferentially extending stiffener ring located radially inwardly from the inner lobes, and a series of circumferentially spaced apart mixer struts radially extending from the inner lobes to the stiffener ring, the mixer struts having a radial length at least equal to a width of a main gas path defined between the inner lobes and the exhaust cone such that the mixer struts extend entirely through the main gas path, the stiffener ring being fixed solely to the mixer struts such as to float with respect to the exhaust cone and permit relative movement therebetween.

15. The exhaust mixer according to claim 14, wherein at least radially displacement between the stiffening ring and the exhaust cone is possible without the stiffening ring and the exhaust cone coming into contact with each other.

16. The exhaust mixer according to claim 14, wherein the mixer struts are substantially seamless hollow tubes.

17. The exhaust mixer according to claim 14, wherein the stiffener ring includes an annular longitudinally extending portion and radially inwardly curved circumferential edges on opposite sides of the longitudinally extending portion, the stiffener ring defining a substantially U-shaped cross-section.

18. The exhaust mixer according to claim 14, wherein the mixer struts are connected to the inner lobes by a reinforced sole, the reinforced sole having a thickness greater than a wall thickness of the annular wall at the inner lobes.

19. The exhaust mixer according to claim 14, wherein the stiffener ring is located entirely radially inward of the main gas path.

20. The exhaust mixer according to claim 19, wherein a radially outer surface of the stiffener ring is substantially flush with an outer wall of the exhaust cone, such that the stiffener ring forms at least part of an inner surface of the main gas path along a portion thereof in the exhaust mixer.

* * * * *